(12) United States Patent
Koehler et al.

(10) Patent No.: US 11,117,525 B2
(45) Date of Patent: Sep. 14, 2021

(54) TRIM PANEL AND DISPLACEABLE FACE PANEL PROVIDING ENHANCED STORAGE FUNCTION

(71) Applicant: FORD GLOBAL TECHNOLOGIES, LLC, Dearborn, MI (US)

(72) Inventors: Juergen Koehler, Cologne (DE); Bhavani Thota, Novi, MI (US); Steven Nicholas Fidh, Ann Arbor, MI (US); Gary D. Mullen, Plymouth, MI (US); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 230 days.

(21) Appl. No.: 16/245,473

(22) Filed: Jan. 11, 2019

(65) Prior Publication Data
US 2020/0223368 A1 Jul. 16, 2020

(51) Int. Cl.
*B60R 7/04* (2006.01)
*B60R 7/08* (2006.01)
*B60R 13/02* (2006.01)
*B60R 13/01* (2006.01)

(52) U.S. Cl.
CPC .............. *B60R 7/046* (2013.01); *B60R 7/08* (2013.01); *B60R 13/0243* (2013.01); *B60R 13/011* (2013.01); *B60R 2013/0287* (2013.01)

(58) Field of Classification Search
CPC .............. B60R 7/046; B60R 13/0243; B60R 2013/0287; B60R 11/00; B60R 7/04; B60R 13/02; B60R 2013/0281; B60R 13/0275

USPC ...... 296/37.13, 146.7, 37.16, 84.1, 63, 57.1, 296/51, 50; 244/544, 543, 539, 547, 282, 244/296, 915, 585, 572
See application file for complete search history.

(56) References Cited

U.S. PATENT DOCUMENTS

| | | | | |
|---|---|---|---|---|
| 4,453,760 | A * | 6/1984 | Hira | B60R 7/046 296/37.13 |
| 6,732,895 | B2 | 5/2004 | Poliquin et al. | |
| 6,926,332 | B2 | 8/2005 | Youngs et al. | |
| 7,121,605 | B2 * | 10/2006 | DePue | B60R 7/06 296/37.12 |
| 7,909,552 | B2 * | 3/2011 | Maresh | B65D 90/0073 410/91 |

(Continued)

FOREIGN PATENT DOCUMENTS

| | | |
|---|---|---|
| DE | 19519507 A1 | 12/1996 |
| DE | 102012004183 A1 | 9/2013 |

(Continued)

OTHER PUBLICATIONS

English Machine Translation of DE102012004183A1 dated Sep. 5, 2013.

(Continued)

*Primary Examiner* — D Glenn Dayoan
*Assistant Examiner* — Sunsurraye Westbrook
(74) *Attorney, Agent, or Firm* — Vichit Chea; King & Schickli, PLLC

(57) ABSTRACT

A apparatus includes a trim panel and a displaceable face pane. The trim panel includes a storage compartment and a guideway having a latching slot and a positioning rack. The displaceable face panel has a trunnion received for sliding movement along the guideway.

19 Claims, 16 Drawing Sheets

(56) References Cited

U.S. PATENT DOCUMENTS

| | | | | |
|---|---|---|---|---|
| 8,210,590 | B1 * | 7/2012 | Moberg | .................. B60J 5/042 |
| | | | | 296/37.13 |
| 9,481,316 | B2 * | 11/2016 | Faruque | ............... B62D 33/027 |
| 2007/0069543 | A1 * | 3/2007 | Stoof | ........................ B60R 7/06 |
| | | | | 296/37.8 |

FOREIGN PATENT DOCUMENTS

| | | | |
|---|---|---|---|
| DE | 102012013168 | A1 | 4/2014 |
| KR | 19970038554 | A1 | 7/1997 |

OTHER PUBLICATIONS

English Machine Translation of DE102012013168A1 dated Apr. 10, 2014.

English Machine Translation of DE19519507A1 dated Dec. 5, 1996.

English Machine Translation of KR19970038554A1 dated Jul. 24, 1997.

* cited by examiner

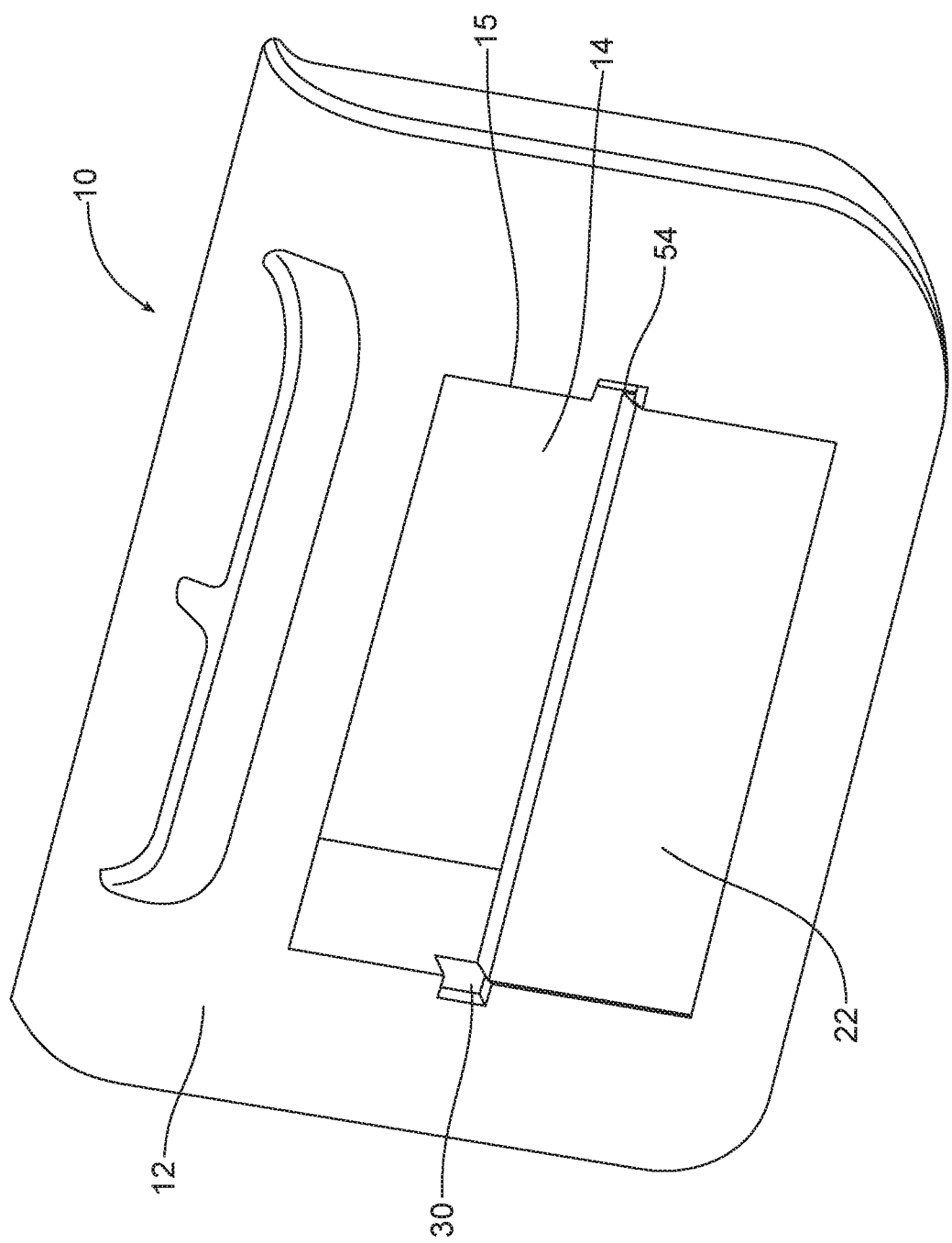

TRIM PANEL AND DISPLACEABLE FACE PANEL PROVIDING ENHANCED STORAGE FUNCTION

TECHNICAL FIELD

This document relates generally to the motor vehicle equipment field and, more particularly, to an apparatus comprising a trim panel and a displaceable face panel providing a more efficient and versatile storage function.

BACKGROUND

One of the most appreciated features of any motor vehicle is the presence of useful storage space. This is particularly important as it relates to the door trim panel map pocket for autonomous vehicle designs. More particularly, users need flexibility so that they are able to store a variety of personal belongings in the vehicle as they are transported from place to place. This is especially true for ride-share, where users need to be able to store their property within their reach and away from strangers. Current map pocket designs force users to sacrifice their needs due to limiting design functionality and flexibility. This document relates to a new and improved apparatus, in the form of a trim panel and displaceable face panel that allow a map pocket to be configured by the user in order to meet the user's particular need for a useful storage space.

SUMMARY

In accordance with the purposes and benefits described herein, a new and improved apparatus is provided. That apparatus comprises a trim panel including (a) a storage compartment and (b) a guideway having a latching slot and a positioning rack. Further, the apparatus comprises a displaceable face panel having a trunnion received for sliding movement along the guideway.

The trim panel may include a first fixed guide pin and the face panel may include a first guide channel receiving the first fixed guide pin. Still further, the trim panel may include a first latch receiver and the displaceable face panel may include a first latch received in the first latch receiver when the displaceable face panel is in a closed position.

The guideway may include a transition section extending between the latching slot and the positioning slot. That transition section may be arcuate. The positioning rack may include a plurality of teeth. Those teeth may define a plurality of sockets wherein each socket is adapted to receive and hold the trunnion when the displaceable face panel is in one of a plurality of deployed positions.

The trim panel may include a first guideway at a first end of the displaceable face panel. That first guideway may receive a first pivot pin of the trunnion. Still further, the trim panel may include a second guideway at a second end of the displaceable guide panel. That second guideway may receive a second pivot pin of the trunnion.

The first fixed guide pin and the first guide channel may be provided at the first end of the displaceable face panel. Further, the apparatus may include a second fixed guide pin and a second guide channel at the second end of the displaceable face panel.

The first latch receiver and the first latch may be provided at the first end of the displaceable face panel. The apparatus may further include a second latch receiver and a second latch at the second end of the displaceable face panel.

In addition, the apparatus may include a retention lip on an inner surface of the displaceable face panel. Further, the apparatus may include a storage hook carried on the trim panel in the storage compartment. Still further, the storage compartment may include an open side and the displaceable face panel may fully close the open side when in the closed position.

In one possible alternative embodiment of the apparatus, the apparatus may comprise a trim panel including a storage compartment having an access opening, a first face panel connected by a first pivot to the trim panel, a second face panel connected by a second pivot to the trim panel and a bifold panel having a first section connected by a third pivot to the trim panel and a second section connected by a fourth pivot to the first section.

In yet another possible embodiment of the apparatus, the apparatus may comprise a trim panel including a storage compartment having an access opening, a face panel connected by a first pivot to the trim panel, a first end panel connected by a second pivot to the face panel, a second end panel connected by a third pivot to the face panel and a front wall panel connected by a fourth pivot to the face panel.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

FIG. 1a is a perspective view of a first possible embodiment of the apparatus including a trim panel, having a storage compartment, and a displaceable face panel shown in a first or closed position.

Figure 3A:
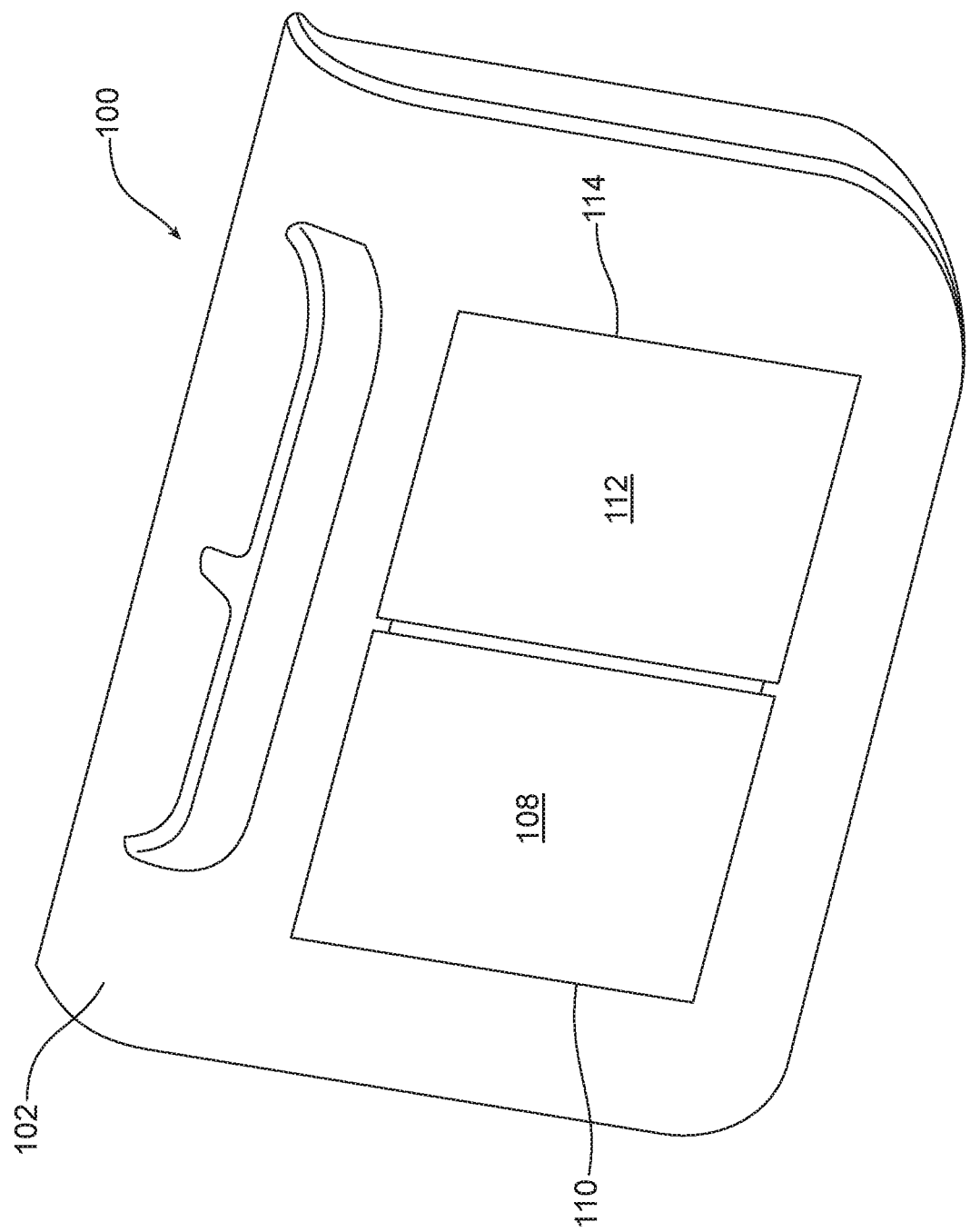
Figure 3B:
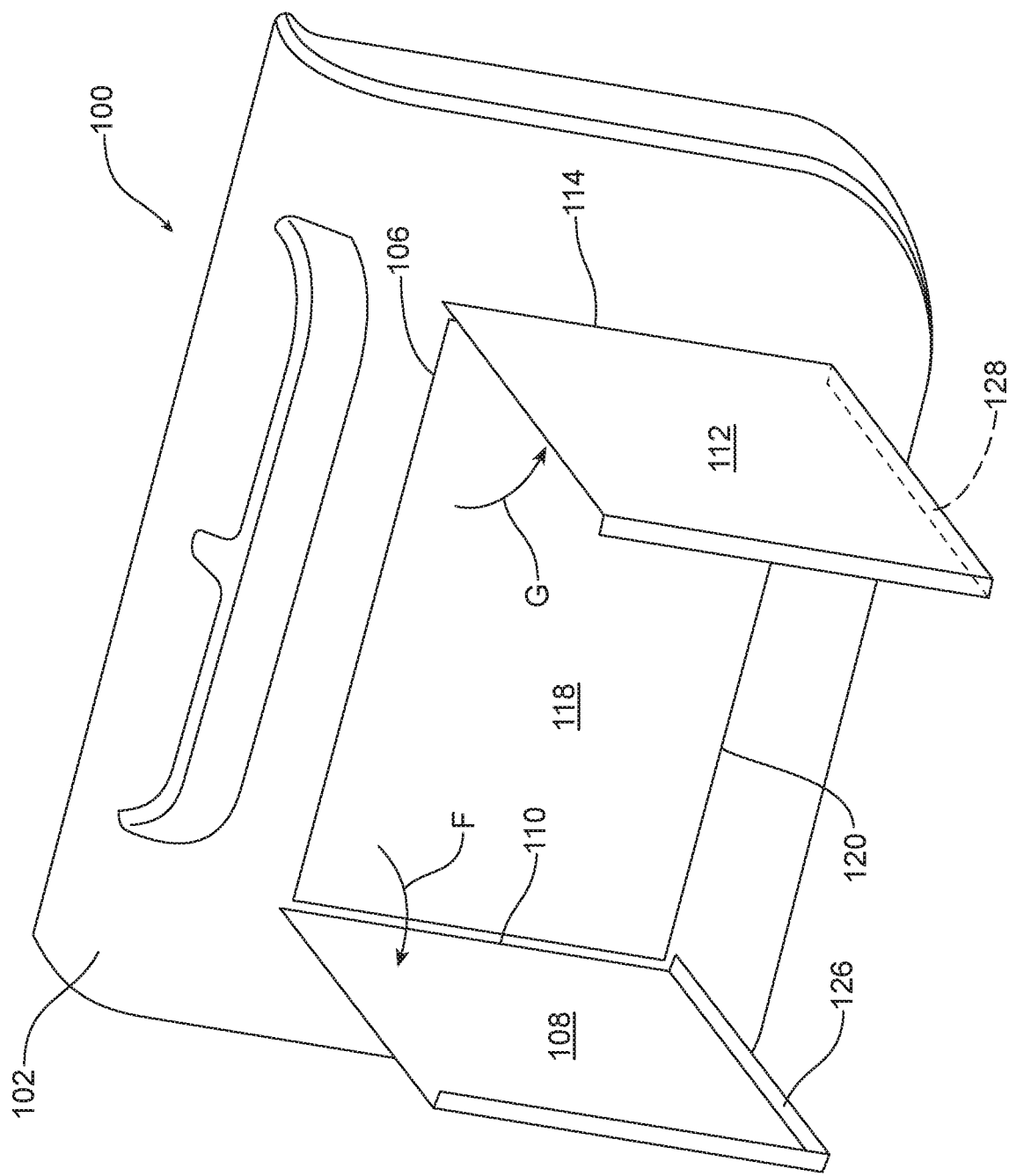
Figure 3C:
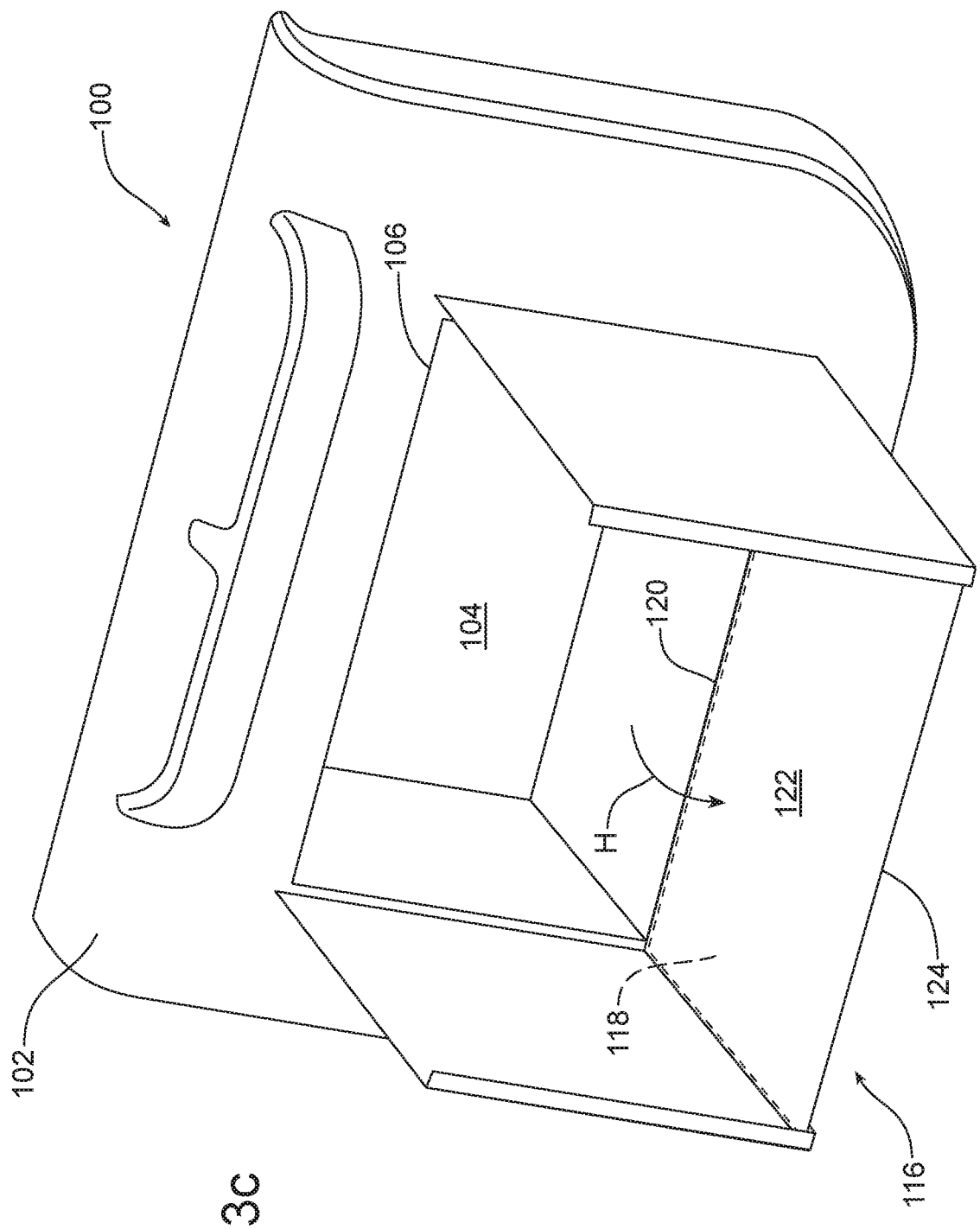
Figure 3D:
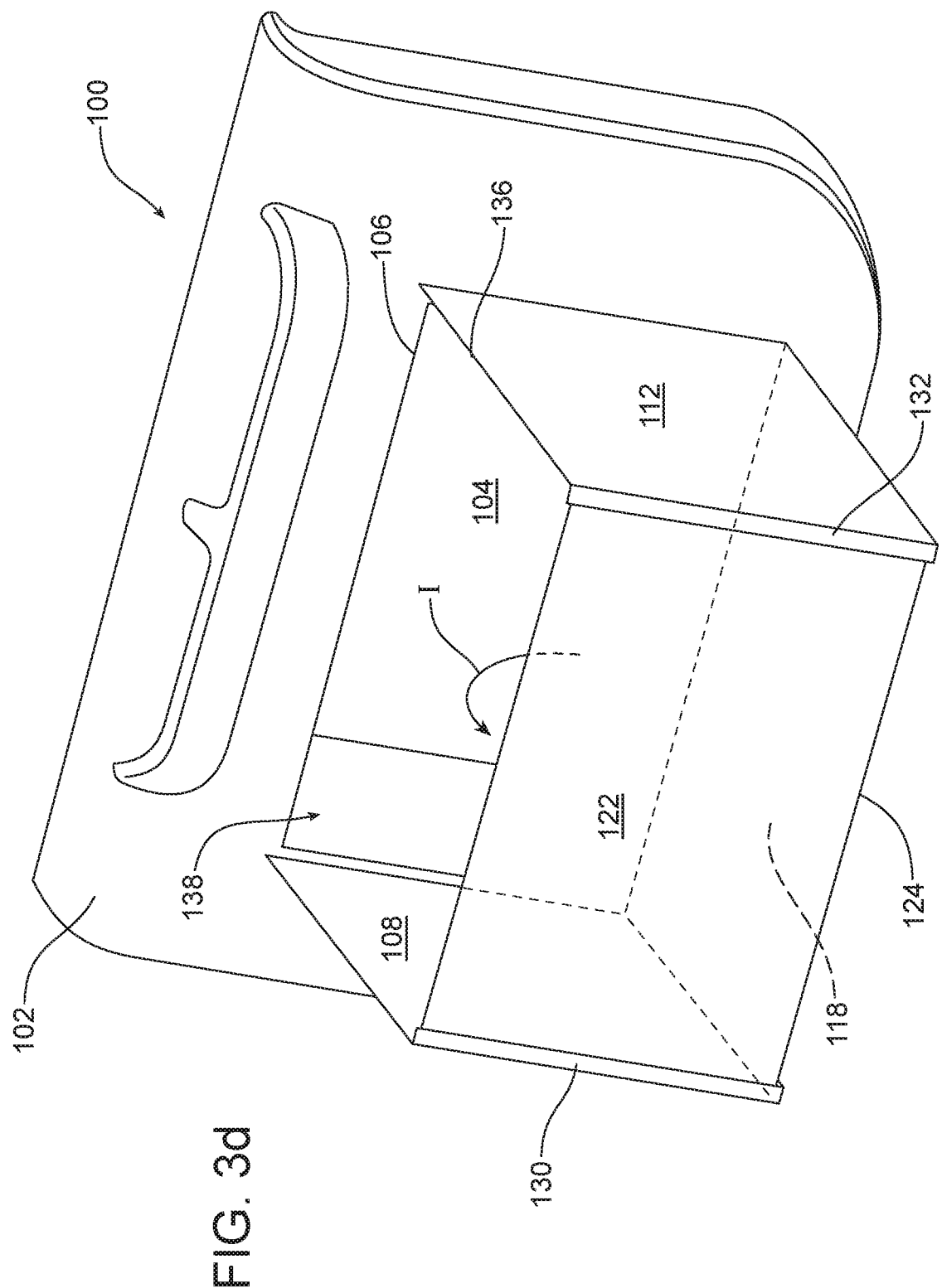

FIGS. 3a-3d are a series of perspective views illustrating a second possible embodiment of the apparatus. FIG. 3a illustrates the apparatus in a closed position. FIG. 3d illustrates the apparatus in a fully deployed position. FIGS. 3b and 3c illustrate the apparatus in two transition positions as it is displaced from the closed position illustrated in FIG. 3a to the fully deployed position illustrated in FIG. 3d.

Figure 4A:
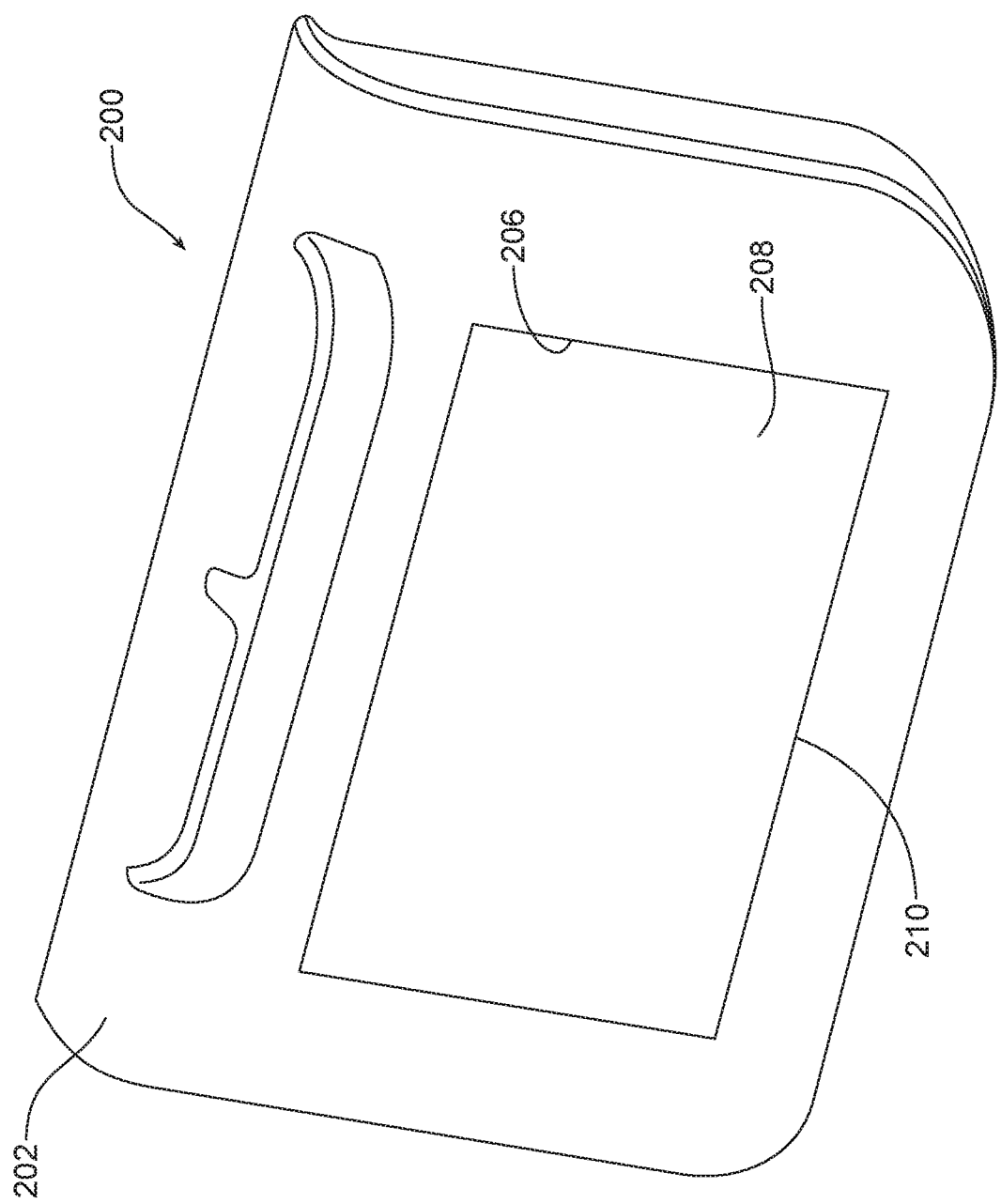
Figure 4B:
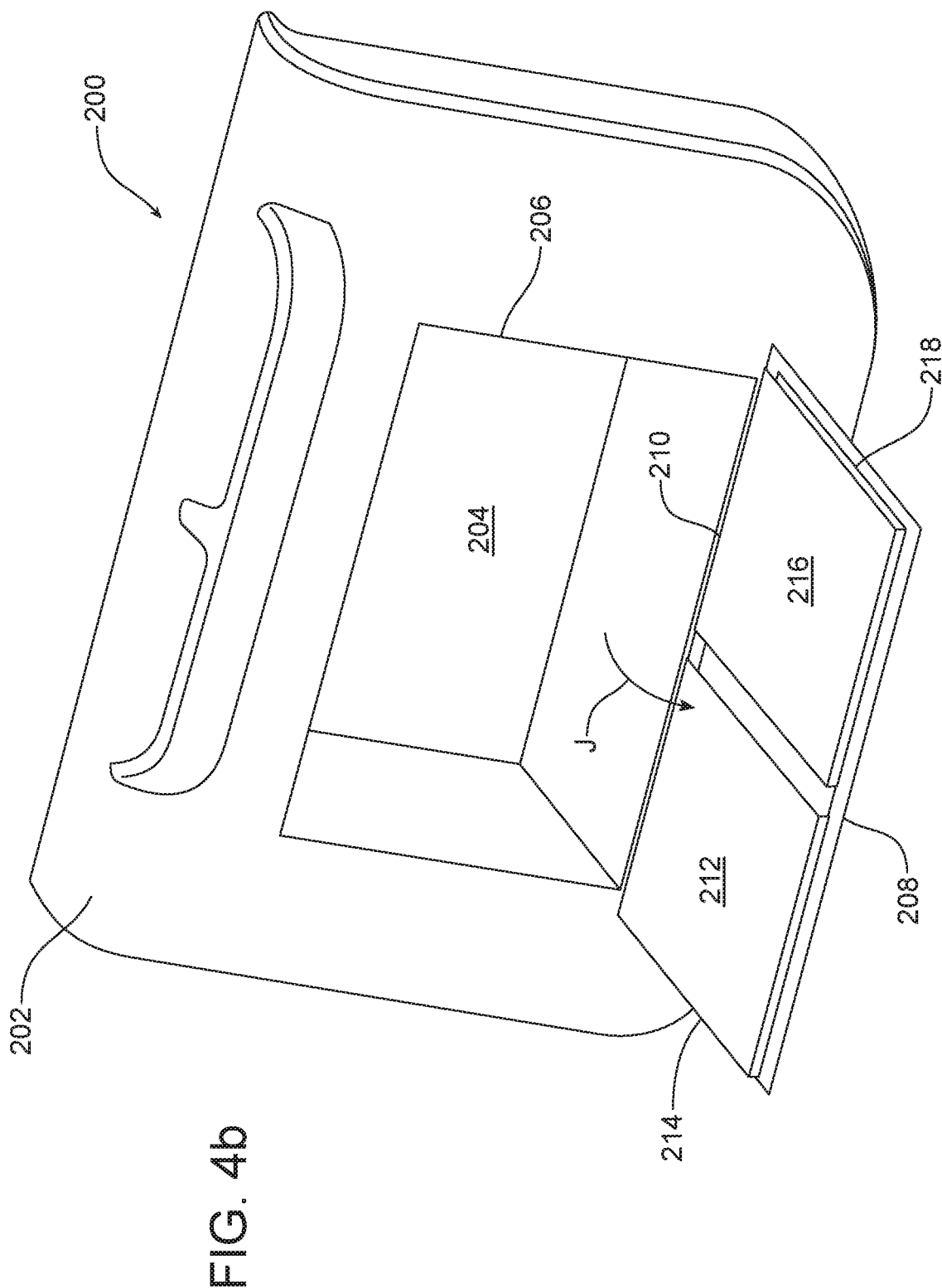
Figure 4C:
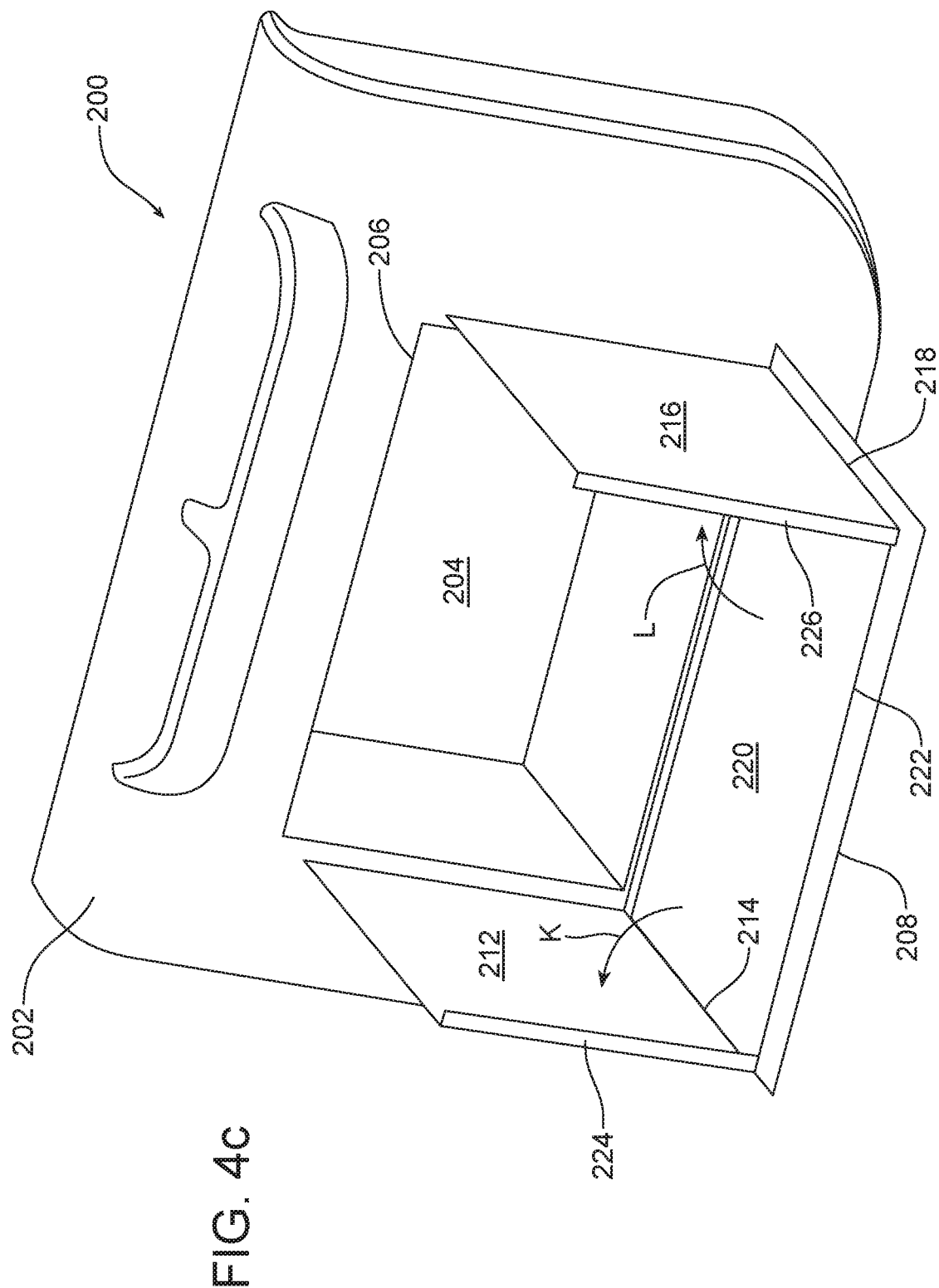
Figure 4D:
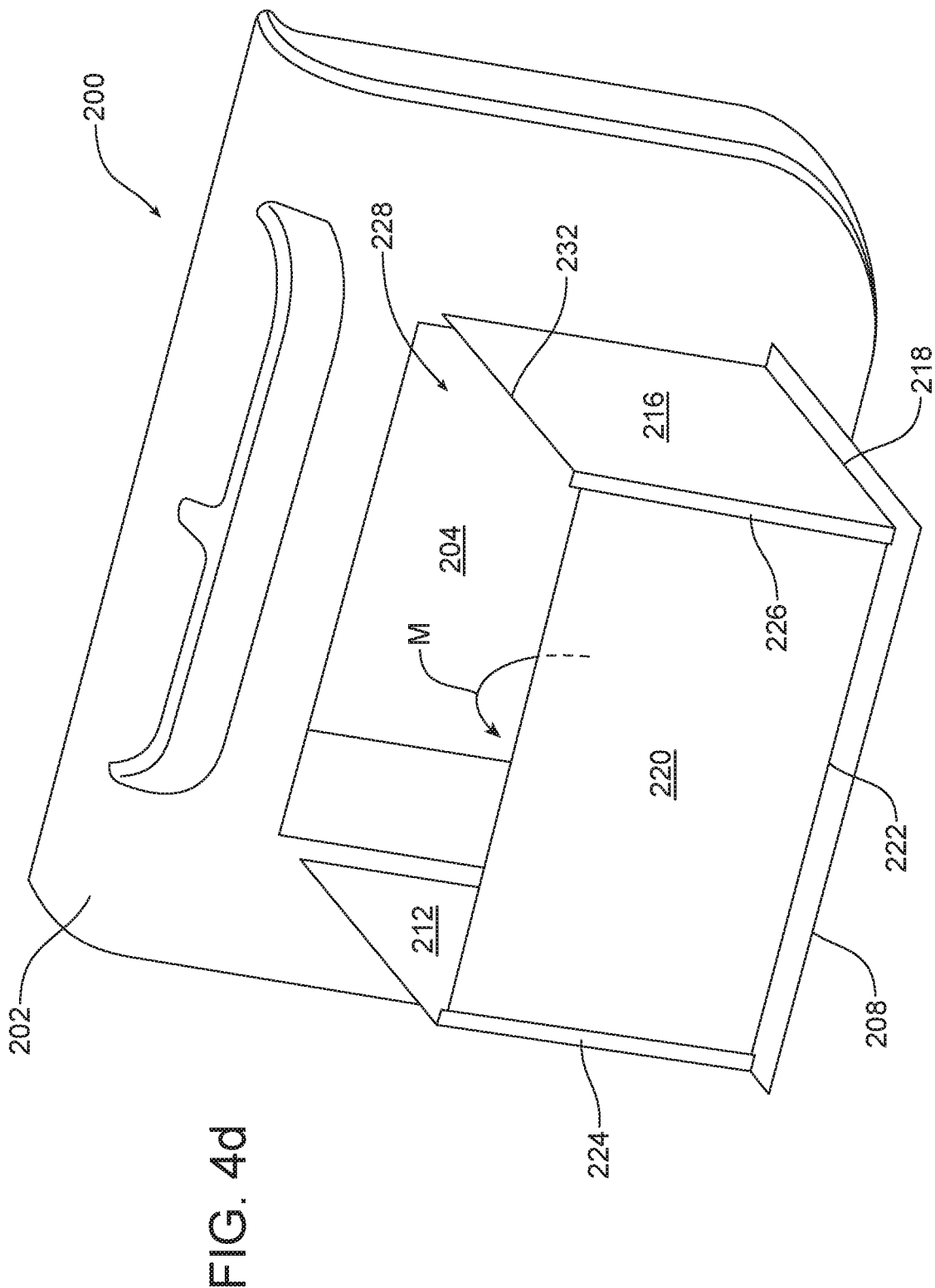

FIGS. 4a-4d illustrate yet another possible embodiment of the apparatus. FIG. 4a illustrates this embodiment of the apparatus in the closed position. FIG. 4d illustrates this embodiment of the apparatus in the fully deployed position. FIGS. 4b and 4c illustrate the apparatus in transition positions as the apparatus is displaced from the closed position illustrated in FIG. 4a to the deployed position illustrated in FIG. 4d.

Reference will now be made in detail to the present preferred embodiments of the apparatus, examples of which are illustrated in the accompanying drawing figures.

DETAILED DESCRIPTION

Reference is now made to FIGS. 1a, 1b and 2a-2e which fully illustrate a first possible embodiment of the new and improved apparatus 10. The apparatus 10 includes a trim panel 12 including a storage compartment 14 and a guideway 16. The guideway 16 has a latching slot 18 and a positioning rack 20. The apparatus 10 also includes a displaceable face panel 22. The displaceable face panel 22 has a trunnion 24 that is received for sliding movement along the guideway 16 in a manner that will be described in greater detail below.

Figure 1B:
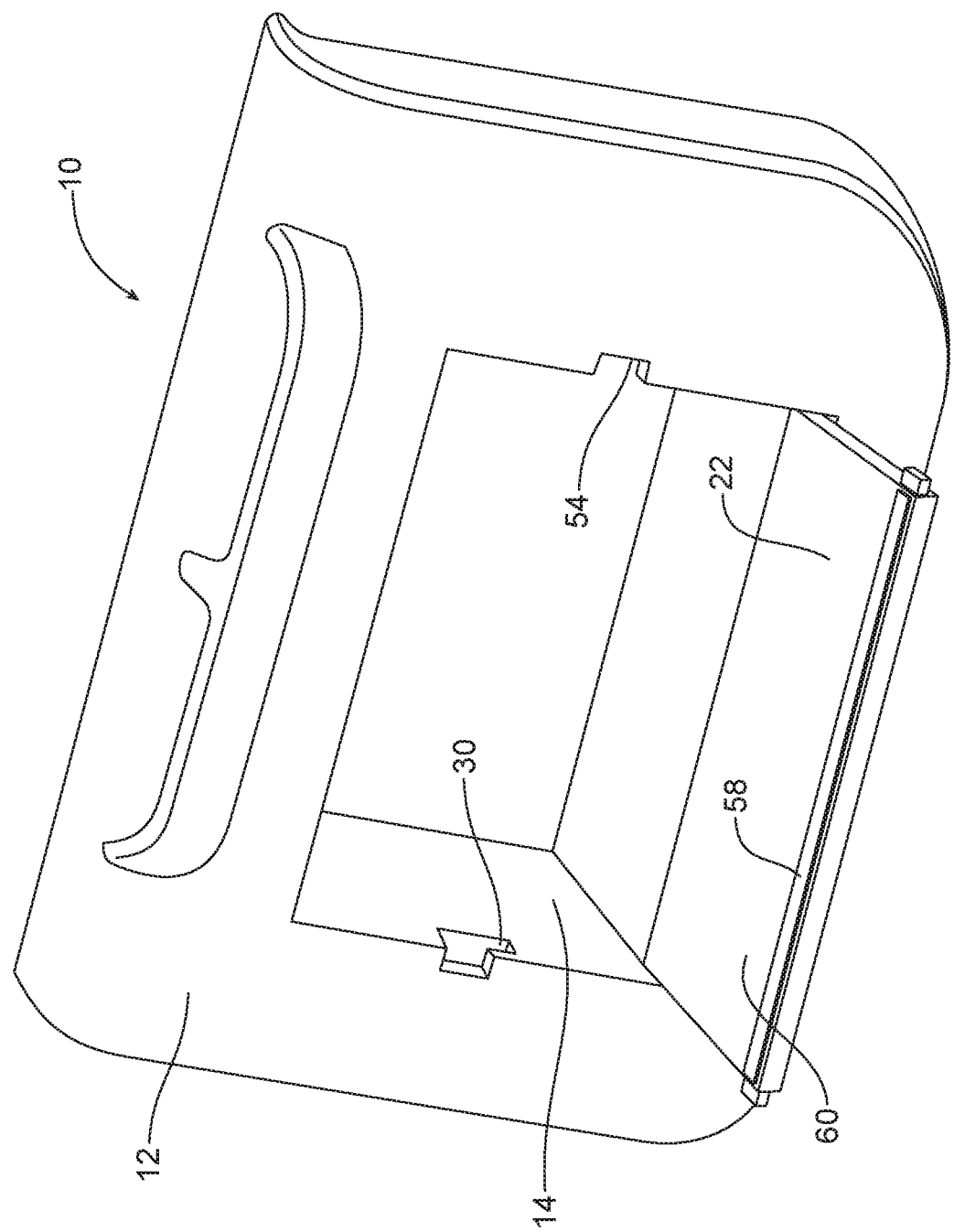
FIG. 1b is a view similar to FIG. 1a but illustrating the displaceable face panel in a deployed position.
Figure 2A:
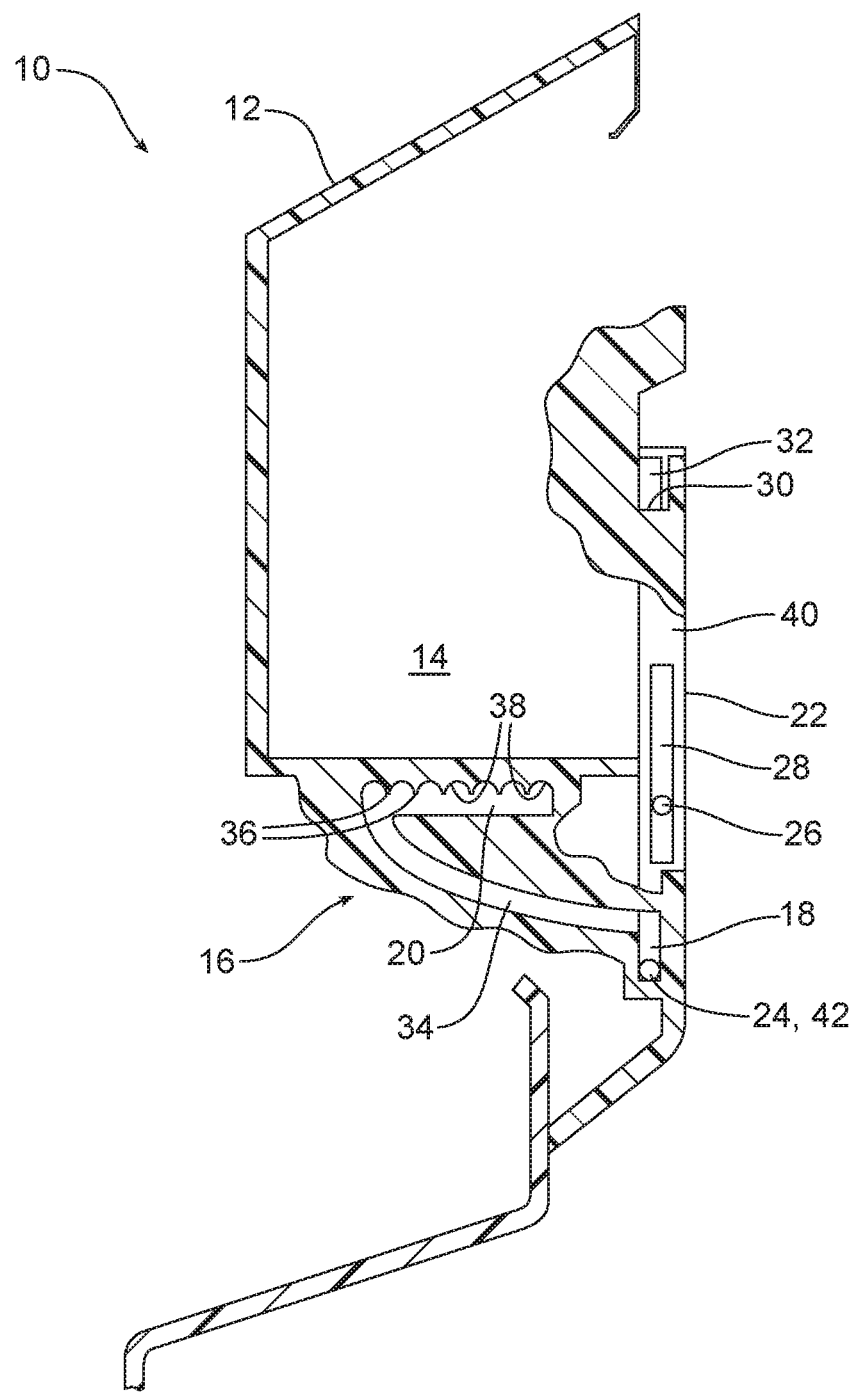
FIGS. 2a-2e are a series of schematic illustrations from the side showing how the displaceable face panel is displaced from the closed position illustrated in FIG. 2a through the transition positions illustrated in FIGS. 2b and 2c into two possible deployed positions illustrated in FIGS. 2d and 2e.

As best illustrated in FIGS. 2a-2f, the trim panel 12 includes a first fixed guide pin 26 and the displaceable face panel 22 includes a first guide channel 28 that receives the first fixed guide pin. The trim panel 12 also includes a first latch receiver 30. The displaceable face panel 22 includes a first latch 32 received in the first latch receiver 30 when the displaceable face panel 22 is in the closed position as illustrated in FIGS. 1a and 2a.

The guideway 16 will now be described in greater detail with reference to FIGS. 2a-2e. As illustrated, the guideway 16 includes a transition section 34 extending between the latching slot 18 and the positioning rack 20. In the illustrated embodiment the transition section 34 is arcuate.

The positioning rack 20 includes a plurality of teeth 36 defining a plurality of sockets 38. Each socket 38 is adapted to receive and hold the trunnion 24 when the displaceable face panel 22 is in one of a plurality of deployed positions as illustrated in FIGS. 1b, 2d and 2f.

The guideway 16 illustrated in FIGS. 2a-2e is actually a first guideway provided in the trim panel 12 adjacent a first end 40 of the displaceable face panel 22. That first guideway 16 receives a first pivot pin 42 of the trunnion 24 fixed to the first end 40 of the displaceable face panel 22. As illustrated in FIG. 2f, the trim panel 12 includes a second guideway 44 adjacent a second end 46 of the displaceable face panel 22 that is adapted to receive a second pivot pin 48 of the trunnion 24 carried on the second end 46 of the displaceable face panel 22. That second guideway includes a second latching slot 45, a second positioning rack 47 and a second transition section 49.

Figure 2B:
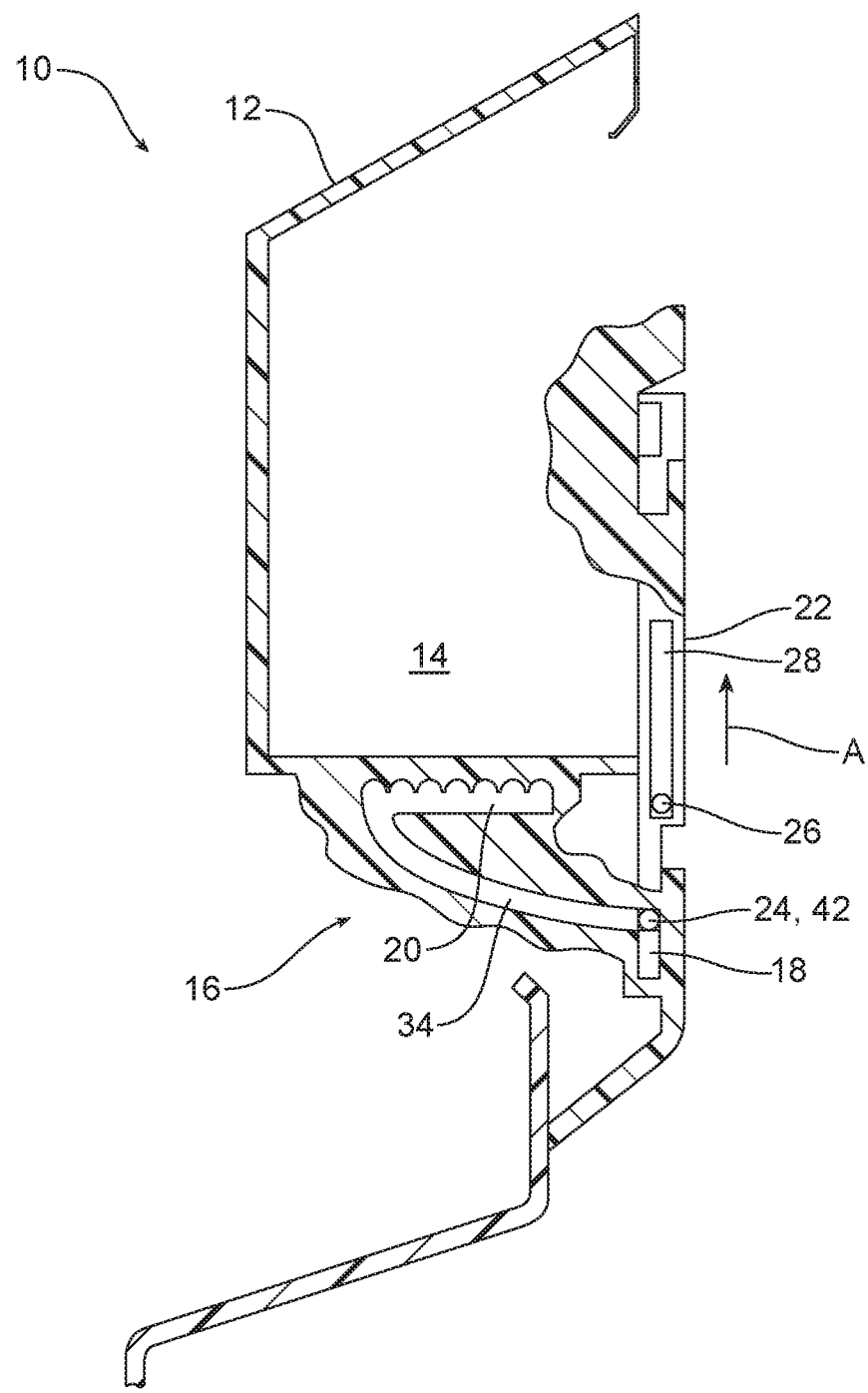
Figure 2C:
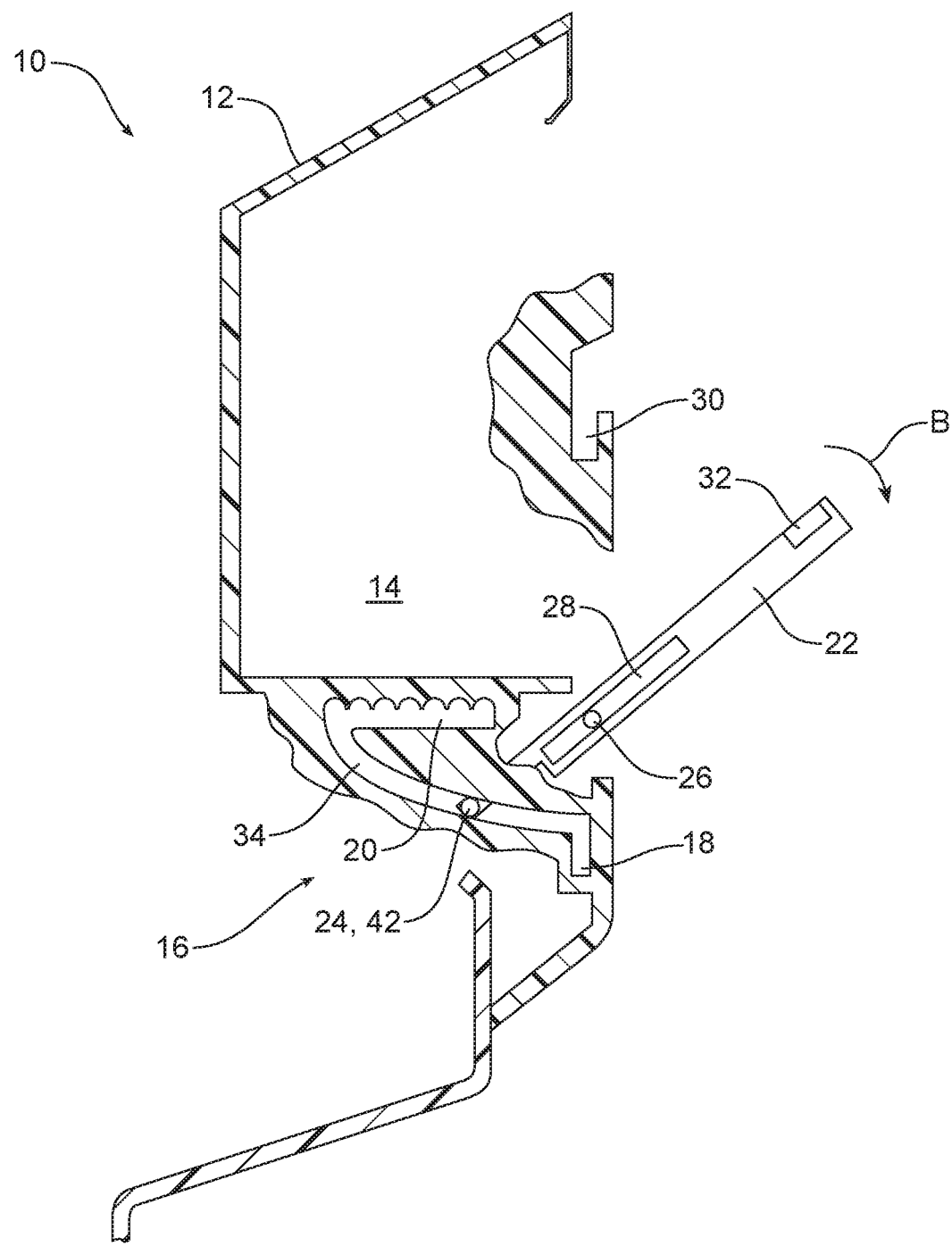
Figure 2D:
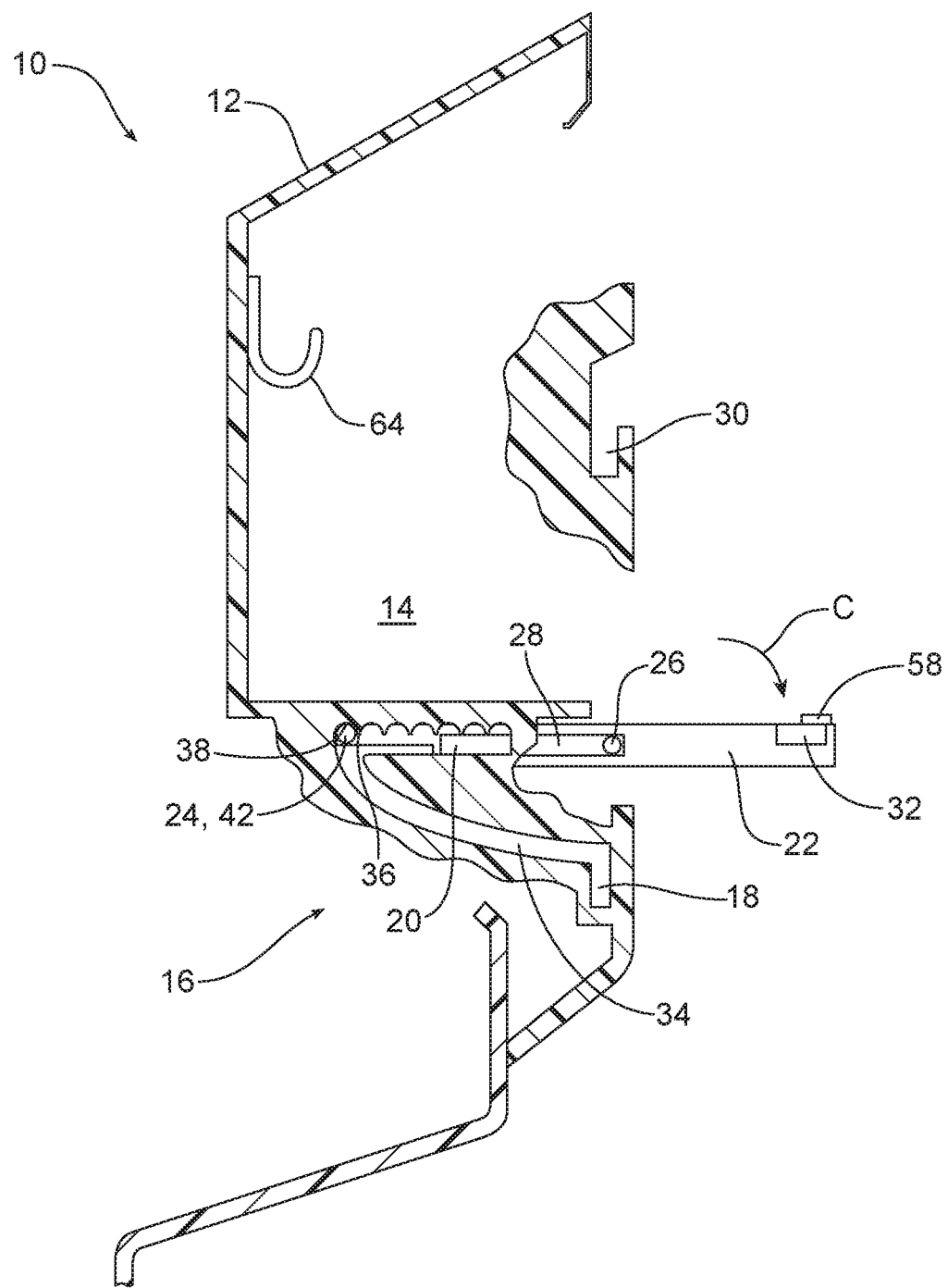
Figure 2E:
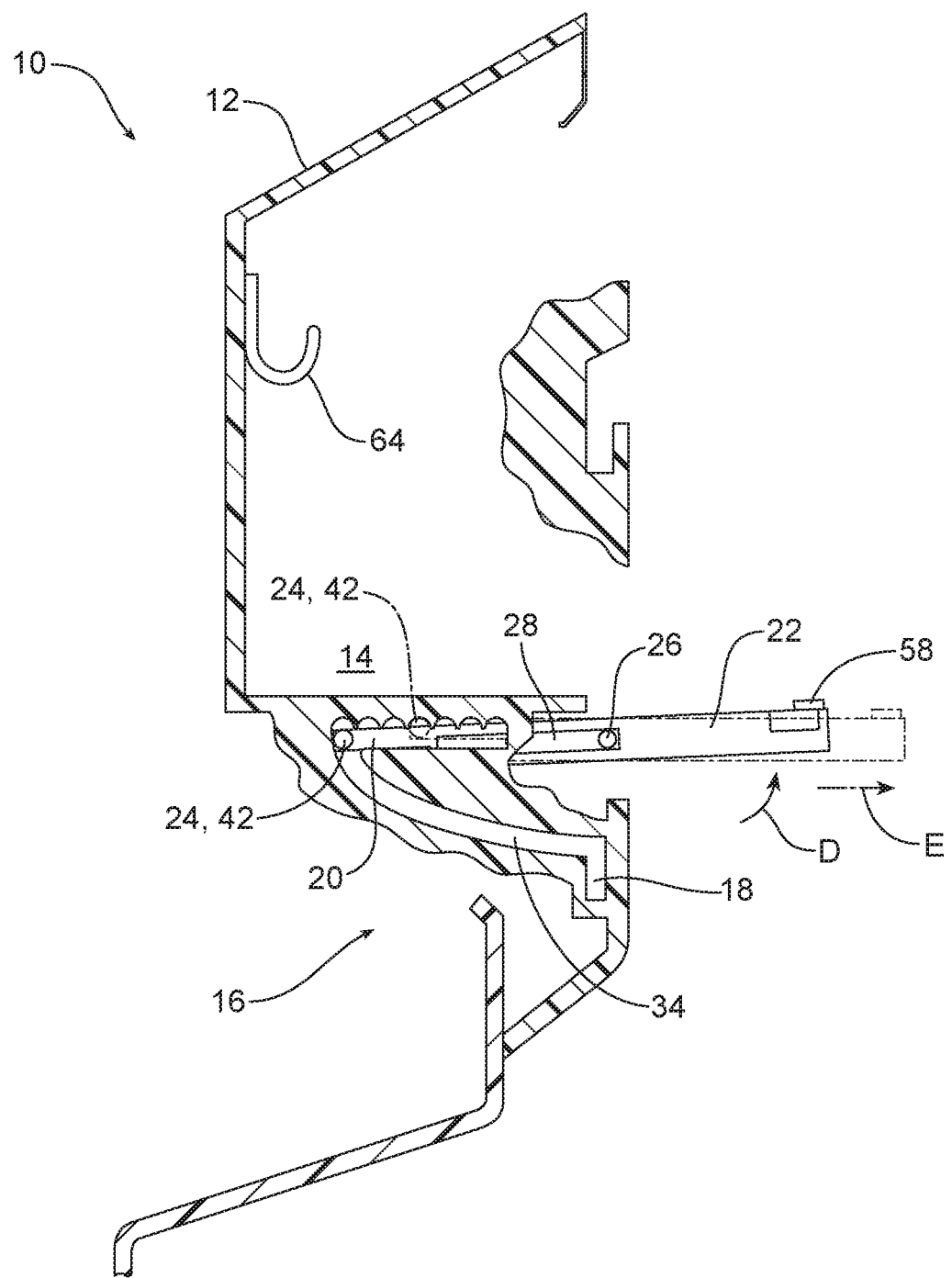
Figure 2F:
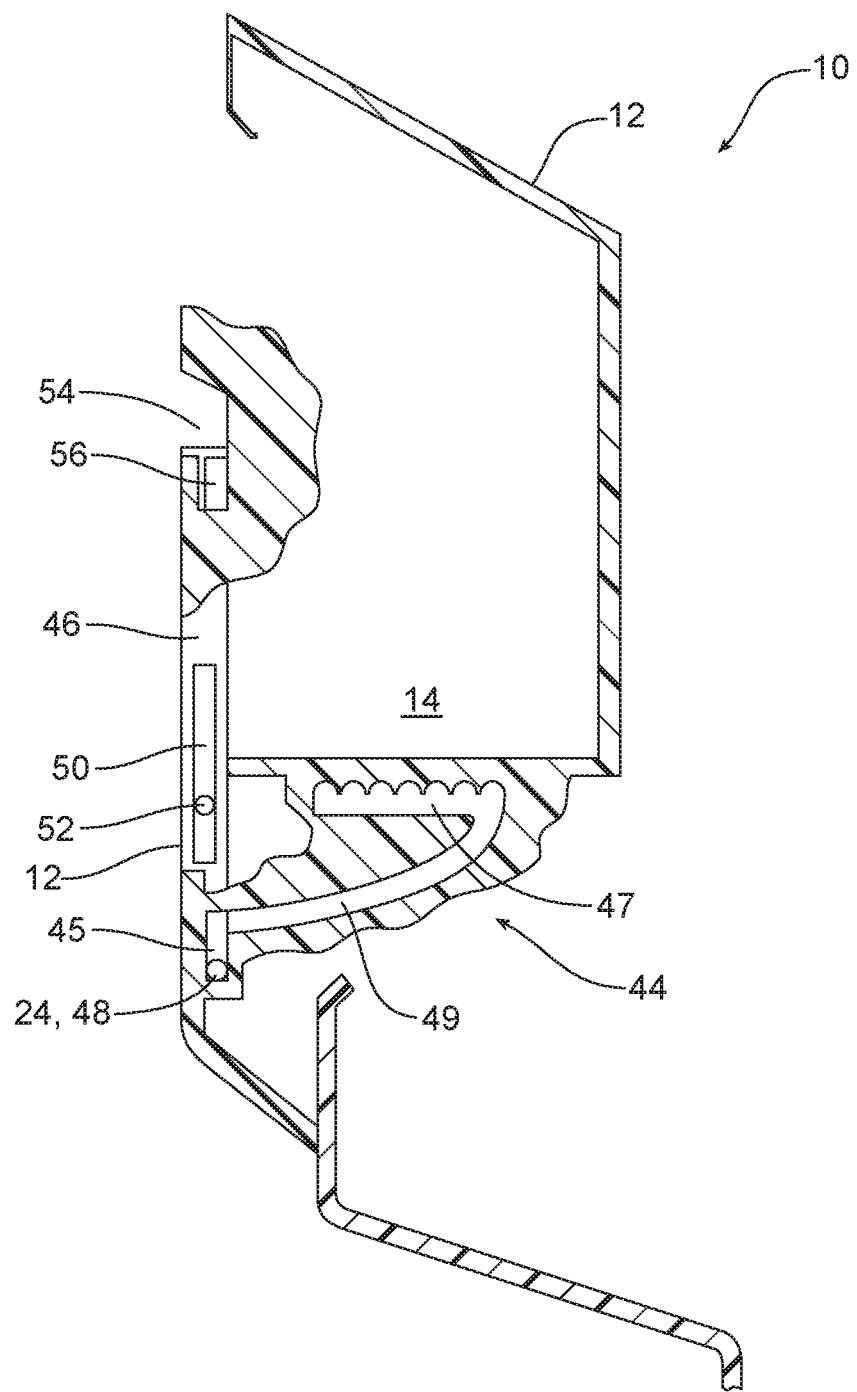
FIG. 2f is a similar view to FIG. 2a of the opposite end of the displaceable face panel.

As also illustrated in FIG. 2f, a second end 46 of the displaceable face panel 22 includes a second guide channel 50 that receives a second fixed guide pin 52 carried on the trim panel 12.

As further illustrated in FIG. 2f, the trim panel 12 includes a second latch receiver 54 that receives and holds a second latch 56 at the second end 46 of the displaceable face panel 22 when the displaceable face panel 22 is in the closed position.

An optional retention lip 58 may be provided on the inner surface 60 of the displaceable face panel 22. Such a retention lip 58 is adapted to help prevent objects from rolling off of the surface 60 of the displaceable face panel 22 when the displaceable face panel 22 is in a deployed position extending substantially horizontally from the storage compartment 14 and the trim panel 12 as illustrated in FIGS. 2d and 2e. In addition, an optional storage hook 64 may be provided on the trim panel 12 within the storage compartment 14 in order to act as a tie down to secure objects in place within the storage compartment 14 when desired.

One may displace the face panel 22 from the closed position illustrated in FIG. 2a by lifting the panel in the direction of action arrow A so that the first and second pivot pins 42 and 48 of the trunnion are free of the respective latching slots 18, 45 and aligned with the respective transition sections 34, 49. See FIG. 2b.

Next, the face panel 22 is pivoted forward (note action arrow B and C in FIGS. 2c and 2d) until the panel is in a first deployed position shown in FIG. 2d. During this movement, the first and second pivot pins 42, 48 travel through the respective transition sections 34, 49 to the respective positioning racks 20, 47. Note the first pivot pin 42 is received in the first socket 38 formed by the first tooth 36 (again see FIG. 2d).

In the illustrated embodiment, the face panel 22 may then be adjusted into any one of the other six deployed positions defined by the teeth 36 and sockets 38 of the positioning racks 20, 47. FIG. 2e shows how the face panel 22 may be flipped up slightly in the direction of action arrow D to release the pivot pin 42 from the socket 38 and then extended to the right (note action arrow E) until the pivot pin is engaged in one of the other sockets 38 defining one of the other deployed positions.

The face panel 22 may be moved in the opposite direction and returned to one of the less extended deployed positions or even to the closed positions illustrated in FIG. 2a as desired.

Reference is now made to FIGS. 3a-3d illustrating an alternative embodiment of the apparatus 100. As illustrated, the alternative embodiment of the apparatus 100 includes a trim panel 102 including a storage compartment 104 with an access opening 106. A first face panel 108 is connected by a first hinge or pivot 110 to the trim panel 102 at a first end of the access opening 106. A second face panel 112 is connected by a second hinge or pivot 114 to the trim panel 102 at a second end of the access opening 106.

A bifold panel 116 includes a first section 118 connected by a third hinge or pivot 120 to the trim panel 102 along the lower margin of the access opening 106, and a second section 122 connected by a fourth hinge or pivot 124 to the first section.

As illustrated in FIG. 3a, when the apparatus 100 is in the closed position, the first face panel 108 and the second face panel 112 close the access opening 106 to the storage compartment 104. One opens the access opening 106 of the storage compartment 104 by swinging the first face panel 108 about the first pivot 110 in the direction of action arrow F and the second face panel 112 about the second pivot 114 in the direction of action arrow G (see FIG. 3b). As shown, the first face panel 108 and the second face panel 112 both pivot outwardly at an angle of approximately 90 degrees into a fully opened position. Next, as illustrated in FIG. 3c, the bifold panel 116 is pivoted about the third pivot 120 in the direction of action arrow H through an arc of approximately 90 degrees until the first section 118 is received and rests upon the ledge 126 provided along the bottom edge of the first face panel 108 and the ledge 128 provided along the bottom edge of the second face panel 112. Next, as illustrated in FIG. 3d, the second section 122 is pivoted through an arc of approximately 90 degrees about the fourth pivot 124 until the second section 122 is brought into contact with the flange 130 carried on the first face panel 108 and the flange 132 carried on the second face panel 112. When fully deployed, the first face panel 108, the second face panel 112 and the bifold panel 116 form a four-sided structure having a first open side in communication with the access opening 106 of the storage compartment 104 and a second open side 136 oriented upward allowing one to place objects in the enlarged compartment 138 defined by the deployed panels and the storage compartment 104.

Reference is now made to FIGS. 4a-4d illustrating yet another alternative embodiment of the apparatus 200. The apparatus 200 includes a trim panel 202 including a storage compartment 204 having an access opening 206. The apparatus 200 also includes a face panel 208 connected by a first hinge or pivot 210 to the trim panel 202 along a lower margin of the access opening 206.

A first end panel 212 is connected by a second hinge or pivot 214 to a first end of the face panel 208. A second end panel 216 is connected by a third hinge or pivot 218 to a second end of the face panel 208.

In addition, the apparatus 200 includes a front wall panel 220 connected by a fourth hinge or pivot 222 to the face panel 208. In the illustrated embodiment, the first pivot 210 is opposite the fourth pivot 222 and the second pivot 214 is opposite the third pivot 218.

The apparatus 100 may be returned to the closed position illustrated in FIG. 3a by folding the various panels 108, 112 and 116 in the opposite sequence.

FIG. 4a illustrates the apparatus 200 in the closed position wherein the face panel 208 completely closes the access opening 206 of the storage compartment 204.

As illustrated in FIG. 2b, one opens the storage compartment 204 by pivoting the face panel 208 downward through an arc of approximately 90 degrees about the first pivot 210 (note action arrow J in Figure fb) so that the face panel extends in a substantially horizontal direction.

Next as illustrated in FIG. 3c, first end panel 212 is pivoted about the second pivot 214 into an upright position (note action arrow K) and the second end panel 216 is pivoted about the third pivot 218 into a fully upright position as illustrated by action arrow L.

Finally, as illustrated in FIG. 4d, next the front wall panel 220 is pivoted about the fourth pivot 222 through an arc of approximately 90 degrees as illustrated by action arrow M until the fourth panel rests against the support flange 224 provided on the first end panel 212 and the support flange 226 provided on the second end panel 216.

When the first end panel 212, second end panel 216 and front wall panel 220 are fully deployed as illustrated in FIG. 4d, they define a four-sided storage compartment 228 having a first open side in communication with the storage compartment 204 in the trim panel 202 and a second open side 232 opening upward to allow easy access.

The apparatus 200 may be returned to the closed position illustrated in FIG. 1 by folding the various panels 220, 216, 212 and 208 in the opposite sequence.

The foregoing has been presented for purposes of illustration and description. It is not intended to be exhaustive or to limit the embodiments to the precise form disclosed. Obvious modifications and variations are possible in light of the above teachings. For example, the face panel 22 in the first embodiment illustrated in FIGS. 1a, 1b and 2a-2f may be sized and shaped to fully close the access opening 15 to the storage compartment 14 when in the closed position instead of leaving that access opening partially open at the top as illustrated in FIGS. 1a and 2a. All such modifications and variations are within the scope of the appended claims when interpreted in accordance with the breadth to which they are fairly, legally and equitably entitled.

What is claimed:

1. An apparatus, comprising:
a trim panel including (a) a storage compartment and (b) a guideway having a latching slot and a positioning rack; and
a displaceable face panel having a trunnion received for sliding movement along said guideway wherein said trim panel includes a first guideway adjacent a first end of said displaceable face panel receiving a first pivot pin of said trunnion and a second guideway adjacent a second end of said displaceable face panel receiving a second pivot pin of said trunnion.

2. The apparatus of claim 1, wherein said trim panel includes a first fixed guide pin and said displaceable face panel includes a first guide channel receiving said first fixed guide pin.

3. The apparatus of claim 2, wherein said trim panel includes a first latch receiver and said displaceable face panel includes a first latch received in said first latch receiver when said displaceable face panel is in a closed position.

4. The apparatus of claim 3, wherein said guideway includes a transition section extending between said latching slot and said positioning rack.

5. The apparatus of claim 4, wherein said transition section is arcuate.

6. The apparatus of claim 5, wherein said positioning rack includes a plurality of teeth defining a plurality of sockets wherein each socket is adapted to receive and hold said trunnion when said displaceable face panel is in one of a plurality of deployed positions.

7. The apparatus of claim 6, wherein said trim panel includes a first guideway adjacent a first end of said displaceable face panel receiving a first pivot pin of said trunnion and a second guideway adjacent a second end of said displaceable face panel receiving a second pivot pin of said trunnion.

8. The apparatus of claim 7, wherein said first fixed guide pin and said first guide channel are provided at said first end of said displaceable face panel.

9. The apparatus of claim 8, further including a second fixed guide pin and a second guide channel at said second end of said displaceable face panel.

10. The apparatus of claim 9, wherein said first latch receiver and said first latch are provided at said first end of said displaceable face panel.

11. The apparatus of claim 10, further including a second latch receiver and a second latch at said second end of said displaceable face panel.

12. The apparatus of claim 1, further including a retention lip on an inner surface of said displaceable face panel.

13. The apparatus of claim 1, further including a storage hook carried on said trim panel in said storage compartment.

14. The apparatus of claim 1, wherein said storage compartment includes an open side and said displaceable face panel fully closes said open side when in a closed position.

15. The apparatus of claim 1, wherein said guideway includes a transition section extending between said latching slot and said positioning rack.

16. The apparatus of claim 15, wherein said transition section is arcuate.

17. The apparatus of claim 16, wherein said positioning rack includes a plurality of teeth defining a plurality of sockets wherein each socket is adapted to receive and hold said trunnion when said displaceable face panel is in one of a plurality of deployed positions.

18. An apparatus, comprising:
a trim panel including (a) a storage compartment and (b) a guideway having a latching slot and a positioning rack; and
a displaceable face panel having a trunnion received for sliding movement along said guideway wherein said displaceable face panel includes a retention lip on an inner surface thereof.

19. An apparatus, comprising:
a trim panel including (a) a storage compartment and (b) a guideway having a latching slot and a positioning rack; and
a displaceable face panel having a trunnion received for sliding movement along said guideway wherein a storage hook is carried on said trim panel in the storage compartment.

\* \* \* \* \*